United States Patent [19]
Dedden et al.

[11] 4,379,632
[45] Apr. 12, 1983

[54] METHOD AND APPARATUS FOR PREVIEWING EXPOSED PHOTOGRAPHIC FILMS OR THE LIKE

[75] Inventors: Hubert Dedden, Langenfeld; Jürgen Pfingst, Leverkusen, both of Fed. Rep. of Germany

[73] Assignee: Agfa-Gevaert Aktiengesellschaft, Leverkusen, Fed. Rep. of Germany

[21] Appl. No.: 320,473

[22] Filed: Nov. 12, 1981

Related U.S. Application Data

[63] Continuation-in-part of Ser. No. 102,152, Dec. 10, 1979, abandoned, which is a continuation of Ser. No. 854,906, Nov. 25, 1977, abandoned.

[30] Foreign Application Priority Data

Dec. 3, 1976 [DE] Fed. Rep. of Germany ....... 2654943

[51] Int. Cl.³ ............................................. G03B 27/80
[52] U.S. Cl. ...................................... 355/68; 355/77; 355/41; 356/444; 250/559
[58] Field of Search .................................. 355/35–38, 355/41, 68–71, 77, 83; 356/443, 444; 250/559, 562, 563, 571, 572

[56] References Cited

U.S. PATENT DOCUMENTS

| | | | |
|---|---|---|---|
| 3,455,632 | 7/1969 | Neale et al. | 355/68 X |
| 3,981,579 | 9/1976 | Weinert et al. | 355/41 X |
| 3,984,184 | 10/1976 | Pflugbeil | 355/77 X |
| 4,099,064 | 7/1978 | Grossman | 356/444 X |
| 4,239,384 | 12/1980 | Treiber | 356/444 X |
| 4,251,157 | 2/1981 | Knor et al. | 356/444 X |

*Primary Examiner*—C. D. Miller
*Assistant Examiner*—W. J. Brady
*Attorney, Agent, or Firm*—Kontler, Grimes & Battersby

[57] ABSTRACT

Successive frames of spliced-together exposed and developed photographic films are examined prior to introduction into a copying machine to prevent the reproduction of film frames having blurred images. Portions of or entire film frames at an examining station are spot scanned, line-by-line, and the resulting video signals are processed to determine one or more quotients which denote the ratio of maximum density gradient to density range of the respective film frames, the ratio of first and second density gradients obtained on scanning the entire frequency spectrum or the lower density portion of a film frame, and the ratio of frequency of occurrence of the first and second density gradients. Such quotient or quotients are compared with a threshold value and the results of comparison are used to classify the film frames as suitable or unfit for the making of reproductions.

37 Claims, 7 Drawing Figures

METHOD AND APPARATUS FOR PREVIEWING EXPOSED PHOTOGRAPHIC FILMS OR THE LIKE

CROSS-REFERENCE TO RELATED CASES

This is a continuation-in-part of our copending patent application Ser. No. 102,152 filed Dec. 10, 1979, now abandoned. The application Ser. No. 102,152 is a continuation of our patent application Ser. No. 854,906 filed Nov. 25, 1977, now abandoned.

BACKGROUND OF THE INVENTION

The present invention relates to a method and apparatus for previewing or screening photographic films or the like, especially to a method and apparatus for examining and evaluating successive originals, such as exposed and developed photographic film frames, prior to introduction into a copying machine. More particularly, the invention relates to improvements in a method and apparatus for examining exposed and developed film frames in order to detect those frames whose quality is unsatisfactory for the making of reproductions, such as prints on photographic paper or another suitable carrier material.

As a rule, exposed customer films which have been delivered, shipped or mailed to a processing laboratory are spliced together end-to-end to form an elongated web which is thereupon caused to advance through a developing machine prior to introduction into a copying apparatus. Developed films are examined prior to introduction into the copier in order to detect and identify those film frames whose quality is unsatisfactory for the making of acceptable prints. The examination of film frames is often automatic, i.e., the equipment which is associated with or incorporated in a copier is sufficiently sophisticated to detect those frames whose images are underexposed or overexposed to such an extent that they are evidently unfit for the making of acceptable prints. However, though highly or extremely complex and expensive, such automatic equipment cannot discriminate between satisfactory film frames and those frames whose images are blurred due to camera shake or improper focussing. At the present time, such defective frames must be detected by a skilled person who examines successive frames prior to their introduction into the copying machine. Detection of film frames which are defective but cannot be identified by presently known automatic equipment is desirable because prints of images of such frames are a frequent cause of dissatisfaction, i.e., the customers are not willing or are reluctant to pay for prints of film frames bearing images which are not worthy of reproduction.

German Offenlegungsschrift No. 2,244,340 discloses a procedure for automatic screening of exposed and developed photographic film frames for the purpose of detecting that frame or those frames which cannot be used for the making of satisfactory prints. In accordance with the proposal in this publication, the image on a film frame is monitored by photoelectric means and the intensities of signals are obtained in response to monitoring of neighboring fields are compared with threshold values. The number and/or intensities of comparison signals whose intensity exceeds the respective threshold value are totalized, and the thus obtained signal is compared with a reference value which is indicative of acceptable sharpness of an image. If the intensity or another characteristic of the signal representing the sum total of aforementioned comparison signals does not match the corresponding characteristic of the reference signal, the image of the film frame is not reproduced during travel through the copying machine. A drawback of the just discussed proposal is that the apparatus is incapable of adequately discriminating between sharp and blurred images, especially when the contrast is low and the number of details in the scanned image is small.

The German-language publication "Bild und Ton" (Vol. 8, 1970, pp. 229–236) discloses a different proposal to ascertain the sharpness of images on film frames. This publication suggests to limit the density contrast measurement to that field or region of a frame which is critical for the determination of sharpness. Such proposal, too, is not entirely satisfactory because the measurement of density contrast and/or density gradient is overly dependent of the motif and contrast of the scanned image. The number of errors is much too high to warrant resort to such a technique for automatic determination of film frames which are unfit for reproduction.

OBJECTS AND SUMMARY OF THE INVENTION

An object of the invention is to provide a novel and improved method of automatically examining exposed and developed film frames or like originals for the quality of their images which ensures that the results of examination are independent from, or less dependent upon, the contrast and motif of the imaged subject or scene.

Another object of the invention is to provide a method of the just outlined character which ensures the detection of all or practically all film frames whose images are unfit for reproduction.

An additional object of the invention is to provide a method which can be practiced by resorting to relatively simple and compact but highly reliable automatic apparatus so that the classification of film frames into those which are fit and unfit for reproduction of their images can be performed without any assistance from or supervision by attendants.

A further object of the invention is to provide a novel and improved apparatus for the practice of the above outlined method.

An additional object of the invention is to provide an apparatus which can be combined with or incorporated in existing copying machines for photographic film frames or other types of originals.

Another object of the invention is to provide the apparatus with novel and improved means for ascertaining the density of selected fields of film frames and for processing the thus obtained information with a view to invariably segregate or identify those film frames whose copying is likely to furnish unsatisfactory prints.

One feature of the invention resides in the provision of a method of examining a series of successive originals of varying sharpness (especially exposed and developed film frames on a web of spliced-together photographic films) to allow detection and/or identification of those originals which are unfit for the making of reproductions. The method comprises the steps of moving successive originals of the series to a predetermined position for examination, photoelectrically scanning at least a selected portion of the original in such position and generating signals which are indicative of the characteristics of the selected portion of the original in the predetermined position (the selected portion of the original is preferably spot scanned, line-by-line), utilizing the signals to ascertain the density range of the selected portion of the original in the predetermined position, processing the signals to determine the density gradient of at least one scanned region (e.g., a line or band) of the selected portion, forming a quotient of the determined density gradient and the density range of the respective selected portion, comparing the quotient with a predetermined threshold value, and classifying the respective original as satisfactory or acceptable for reproduction when at least one of the quotients exceeds the threshold value.

The invention has been conceived on the basis of the following considerations: The sharpness of outlines of the photographed objects is always less pronounced than, or does not exceed, the maximum outline sharpness which latter is determined by the contrast reproducing ability of the photosensitive layer on the film. Images which do not serve technical or scientific purposes, (e.g., exposures of the type normally made by amateur photographers) invariably or practically invariably, include the image of at least one "object" with pronounced or readily detectable outlines. Otherwise stated, the likelihood of total absence of a pronounced (i.e., steep) transition from a higher to a lower density or vice versa on the image of a film frame which has been properly exposed is very remote. Therefore, if the examination of an image fails to reveal the presence of at least one steep transition from higher to lower density or vice versa, the examined image can be classified among those which lack the requisite sharpness for the making of acceptable reproductions. Consequently, it is not even necessary to examine or evaluate any other characteristic or characteristics (e.g., the motif) of the contents of the image of a film frame when the image lacks at least one pronounced transition from higher to lower density or vice versa.

Furthermore, each exposed film frame exhibits at least one unit area or spot of maximum density and at least one unit area or spot of minimum density. Such unit areas may but need not be located in close or immediate proximity to each other. The difference (Dmax−Dmin) between the densities of such unit areas represents the density range of the film frame. The difference between the densities of two neighboring unit areas in any portion of a film frame can equal but never exceeds the aforementioned density range provided, of course, that the dimensions of unit areas which are scanned for the purpose of ascertaining the density range and the difference between the densities of any two neighboring or spaced-apart portions of the film frame are the same. It follows that the examination resulted in detection of that detail of an image which exhibits maximum sharpness if the quotient of the maximum density difference between two neighboring unit areas and the density range equals one. As mentioned above, this holds true if the size of unit areas (spots) is the same not only for determination of the densities of neighboring unit areas but also for determination of the density range. It is important to ensure that, while scanning the film frame, the unit area of successively scanned portions of the frame is sufficiently small (i.e., the scanning or spatial frequency is sufficiently high) that the scanning embraces all lines or bands which are important for visual evaluation of sharpness. The expression "scanning frequency" is intended to denote the density changes at a given location, i.e., if the brightness varies within a distance of 1 mm at regular intervals, for example 20 lines, one can refer to a scanning or spatial frequency of 20 lines/mm. The examination of density differences can be replaced with examination of the density gradient (dD/dx).

In order to obtain an indication concerning the sharpness of a film frame, it is proposed in accordance with the invention to determine the quotient of the maximum density gradient dD/dx and the maximum density difference or range of the respective frame. Such quotient, hereinafter called the first sharpness quotient and designated $Q_A$, can be expressed by the following equation:

$$Q_A = \frac{\text{Max} \, (dD/dx)}{(\text{Max} \, D(x) - \text{Min} \, D(x))} \quad (1)$$

The thus obtained sharpness quotient $Q_A$ of a given frame can be compared with a predetermined threshold value, i.e., it serves as a criterion for the classification of frames into those exhibiting or those lacking the required sharpness.

If the examination of a film frame fails to reveal any pronounced or sharp transition of density, such film frame is to be classified with unsatisfactory frames, i.e., with those lacking the required sharpness for the making of satisfactory reproductions of their images. Such determination can be made without taking into consideration any other features of the image content (such as the motif). The frame which lacks the required minimum sharpness can constitute an empty frame, i.e., a frame without any image (object) thereon.

In accordance with a more specific feature of the just discussed method of ascertaining the quality of images on film frames or the like, suitable means may be provided to maintain the signal denoting the extent of contrast or contrast range of the frames to be tested at a constant level. In such instances, the ascertained maximum density gradient can be used directly as an indication of image sharpness in the following way:

$$Q_K = \underbrace{\frac{1}{(\text{Max} \, D(x) - \text{Min} \, D(x))}}_{\text{const.}} \cdot \text{Max} \, \frac{dD}{dx} \quad (2)$$

By way of example, this can be accomplished in that a frame is examined twice, first to ascertain the actual density range which is then compared with the assumed constant density range. The amplification factor of the amplifier which processes the video signals is selected in such a way that the actual density range is expanded or contracted (narrowed) so as to match the constant density range. The same frame is then examined for the second time while the amplification factor is adjusted as per above, and the sharpness quotient $Q_K$ is ascertained in accordance with the equation (2) by multiplying the constant value of the density range with the maximum density gradient which has been changed to the same extent.

The aforediscussed method renders it possible to distinguish between sharp and insufficiently sharp contents of succcessive film frames with a degree of reliability which is incomparably higher than that in accordance with the aforediscussed conventional proposals. Furthermore, the reliability is not affected by low contrast of the images on film frames and/or by the absence of many pronounced details, i.e., the classification is reliable even if the number of objects which are imaged on a frame is small or very small. Extensive measurements by resorting to a wide variety of film frames indicated that the sharpness quotient $Q_A$ or $Q_K$ is practically (or at least substantially) independent of the motif and is also independent of the contrast in the linear portion of the gradation curve of the photosensitive layer.

The improved method can be practiced in two additional ways. In accordance with one further embodiment, it is possible to even more readily distinguish between sharp and insufficiently sharp images by resorting to a so-called frequency comparison technique. This means that all such frequency ranges which are important or crucial for the sharpness of an image are filtered out from the video signal and, after differentiation, one obtains the sharpness quotient $Q_U$ in accordance with the equation (1). This quotient $Q_U$ is then compared (brought in proportion) with the sharpness quotient $Q_A$ of the original signal (i.e., of a signal which was not modified or otherwise distorted by filtering) so that one obtains a sharpness comparison value $Q_V$ which is practically independent of the contrast range. This sharpness comparison value or second sharpness quotient $Q_V$ can be expressed by the following equation:

$$Q_V = \frac{Q_A}{Q_U} = \frac{\frac{\text{Max}(dD/dx)}{\text{Max } D(x) - \text{Min } D(x)} \text{ full frequency spectrum}}{\frac{\text{Max}(dD/dx)}{\text{Max } D(x) - \text{Min } D(x)} \text{ lower part of frequency spectrum}} = \frac{\text{Max}(dD/dx) \text{ full frequency spectrum}}{\text{Max}(dD/dx) \text{ lower part of frequency spectrum}} \quad (3)$$

This is based on the premise that the range of contrast is not altered to an appreciable extent by elimination of the higher portions of the frequency spectra in the contents of an image (i.e., upon elimination of fine details and the sharpness of the outline). As regards the further steps of this method, the sharpness quotient $Q_V$ is compared with an adjustable threshold value, the same as in accordance with the first embodiment of the method, and the image of a frame is classified as one of satisfactory or insufficient sharpness in dependency on the results of such comparison, i.e., depending upon whether the quotient $Q_V$ exceeds or is below the selected threshold value.

The just discussed frequency comparison technique involves a reference arrangement which is based on the following relatively simple reasoning: Since the frequency of an unsharp image is relatively low, it is not possible to eliminate such low frequency by filtering. Consequently, the output signals in the denominator or divisor and dividend of the quotient denoting the density gradient are substantially identical. However, a sharp image exhibits high frequencies which can be filtered out in a so-called "unsharp" channel (denominator). The thus obtained output signal distinguishes considerably (depending on the sharpness of image) from the unfiltered original signal (dividend) in the so-called "sharp" channel. Such reference arrangement furnishes highly satisfactory results and is very stable because all instabilities and other influences cancel or balance each other with the exception of those differences which are attributable to different limit frequencies. In such case, the density range as such does not appear as a signal so that underexposure or overexposure of a film frame cannot adversely influence the ascertainment of sharpness of the images as long as the signal denoting the amplitude of the gradient is discernible from noise.

A strongly overexposed or underexposed film frame can exhibit a pronounced sharpness. In the event of such maximum or minimum exposure to light, the density gradient of a film frame can decrease to such an extent that it is only slightly above the resolution capability of the electronic apparatus which is used for evaluation of the film frames prior to the making of prints. In such instances, the resolution of the density gradient does not suffice to form a sharpness quotient in accordance with the frequency comparison technique, i.e., the aforediscussed embodiment of the method which involves the frequency comparison technique does not ensure reliable identification of an image which contains recognizable details, i.e., of an image which warrants the making of one or more prints. It is then necessary to resort to the other additional embodiment which is based on the recognition that, normally, a sharp image is richer in details than an image of unsatisfactory sharpness. It is true that the frequency at which a threshold value of the density gradient is exceeded within a given original (exposed and developed film frame) cannot be relied upon directly as an indicator of sharpness of the respective image. However, and in accordance with the aforementioned other additional embodiment of the method, one can obtain a (third) sharpness quotient $Q_H$ which can constitute a further criterion for the classification of images as exhibiting or lacking the required sharpness. Such third sharpness quotient is obtained by scanning the image with a high band frequency as well as with a low band frequency and comparing the frequencies H at which the predetermined threshold value S is exceeded during the two measurements. This can be expressed by the following equation:

$$Q_H = \frac{H_s(dD/dx) \text{ full frequency spectrum}}{H_s(dD/dx) \text{ lower part of frequency spectrum}} \quad (4)$$

It is also within the purview of the invention to eliminate the undesirable effects of dust particles and/or scratches on the film frames. Such particles and/or scratches can cause improper classification of film frames by creating the false impression that the density gradient is high. The same effect can be produced by blurred images which are obtained by partial overexposure of the corresponding film frames. Typical examples of such images are those depicting reflecting surfaces (or mirrors, lamps, glasses or the like) or those made with the lens facing the light source (for example, sun rays penetrating through tree tops, etc.). The exposures exhibit spots or areas of maximum density which are surrounded by sharply defined edges and furnish a sharp contrast. The result is a pronounced rise of the density gradient so that, in the absence of remedial action, the corresponding image (though blurred) is classified as a sharp image which is fit for the making of a print.

Film frames of the just outlined character can be properly classified (as unfit for the making of prints) by carrying out a correction to eliminate the effect of exceptional cases which involves the utilization of maximum density gradient for determination of the aforementioned quotient only if the maximum density gradient appears a predetermined number of times (i.e., the frequency of such maximum density gradient in a scanned image must exceed a preselected minimum value). Otherwise stated, one resorts to a frequency-denoting threshold value for the density gradient.

The same or similar results can be achieved if one utilizes only those density gradients for calculation of the sharpness quotient which appear along the edges of details having an area exceeding a preselected minimum area, i.e., by increasing the size of the scanned spots. Errors which arise as a result of partial overexposure can also be eliminated by taking into consideration only those density gradients which are ascertained upon evaluation of details whose density does not exceed a predetermined maximum density. In other words, one excludes from the quotient forming step all gradients whose density exceeds a predetermined value. The just described correction to eliminate the effects of exceptional cases has been found to contribute to reliability of the improved method by ensuring that partial overexposure, dust particles and/or reflecting surfaces cannot lead to improper classification of film frames.

To summarize, the improved method exhibits the advantage that one can detect, practically without fail, unsharp images even if the contrast is low and even if the examination is rendered more complex by the presence of foreign matter, reflecting surfaces and/or partial overexposure. By multiplying the aforediscussed sharpness quotients, i.e., by ascertaining the value of $Q_K \cdot Q_V \cdot Q_H$, one can achieve a superior statistical classification. Experiments have proven that an examination of a large number of sample exposures failed to classify any satisfactory film frames as belonging to the group of unsharp images and that a large majority of unsharp images were classified as belonging to the group of images which are unfit for the making of acceptable reproductions. In other words, the improved method invariably insures that all acceptable film frames are copied and that the number of unsatisfactory film frames which are copied as negligible.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
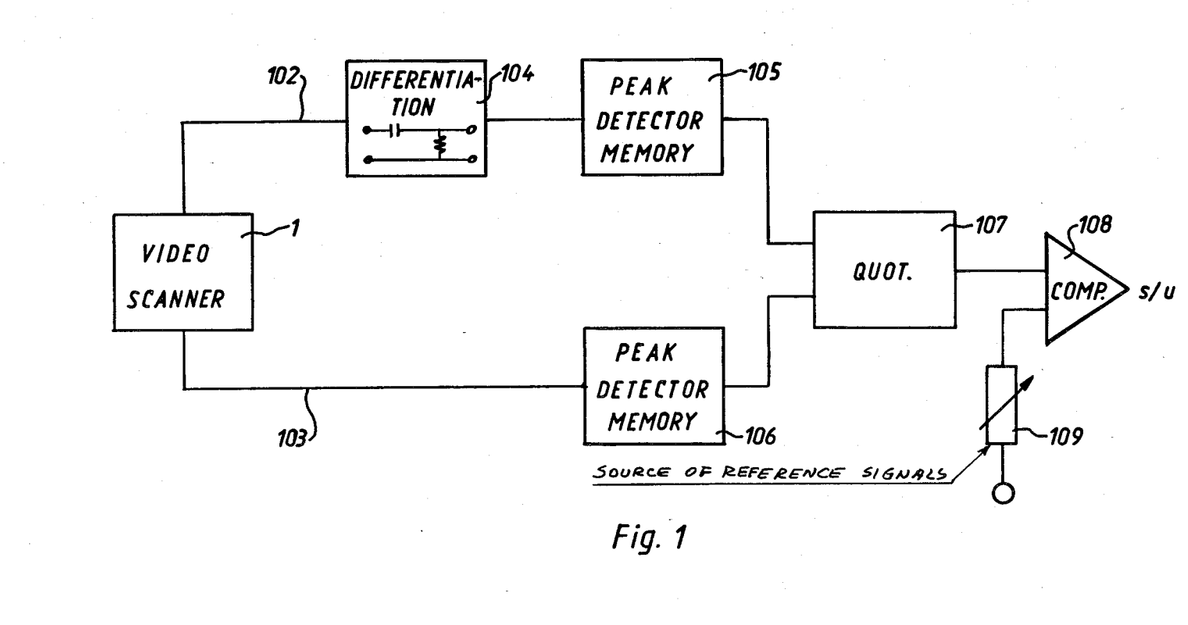
FIG. 1 is a circuit diagram of an apparatus which can be utilized to ascertain the quotient $Q_A$.

The diagram FIG. 1 denotes an apparatus which can be utilized to ascertain the first sharpness of quotient $Q_A$ (equation (1)). The reference character 1 denotes a video scanner (e.g., a vidicon tube) whose output signal is transmitted via two channels or paths 102 and 103. The first channel 102 contains signal processing means including a differentiating circuit 104 and a peak detector memory 105. The second channel 103 contains a signal utilizing means here shown as a peak detector memory 106. The outputs of the memories 105 and 106 are connected with the corresponding inputs of a quotient forming circuit 107 whose output is connected to the first input of a comparator circuit 108. The second input of the comparator circuit 108 is connected with a variable resistor 109 which can select the threshold value for the amplifier 108.

When the apparatus embodying the circuit arrangement of FIG. 1 is in use, the scanner 101 carries out a spot-by-spot monitoring of at least a selected portion of an original which is held in a predetermined position and transmits amplified signals to the channels 102 and 103. The differentiating circuit 104 processes the signals by converting each upwardly sloping flank into a peaked pulse whose amplitude depends on the steepness of the respective flank. The memory 105 stores only the maximum pulse, namely, the maximum positive pulse. In other words, a previously stored pulse is erased as soon as the input of the memory 105 receives a pulse of greater amplitude. Consequently, when the scanning of a portion of or an entire original (film frame) is completed, the memory 105 stores a pulse which denotes the value of the maximum density gradient.

Let it be assumed that one density limit is determined by the basic black of a frame; the maximum amplitude of the video signal then denotes the other density limit and, consequently, also the density range. This is the reason that the output of the scanner 101 is connected directly with the input of the peak detector memory 106 (via channel 103). The memory 106 is designed to recognize (ascertain) and store the signal denoting the density range. The quotient forming circuit 107 processes the signals appearing at the outputs of the memories 105 and 106 in accordance with the equation (1) to furnish a signal which corresponds to the first sharpness quotient $Q_A$ by dividing the signal denoting the maximum density gradient with the signal which denotes the density range. The signal denoting the sharpness quotient $Q_A$ is applied to the first input of the comparator circuit 108 which compares such signal with the reference signal denoting the empirically ascertained threshold value. If the intensity or another characteristic of the signal denoting the sharpness quotient $Q_A$ (i.e., the signal at the output of the circuit 107) exceeds the corresponding characteristic of the reference signal which is furnished by the resistor 109, the corresponding frame is worthy of copying and the signal at the output of the comparator circuit 108 is used to initiate (or not to prevent) the copying operation in a manner not forming part of the present invention.

Figure 1A:
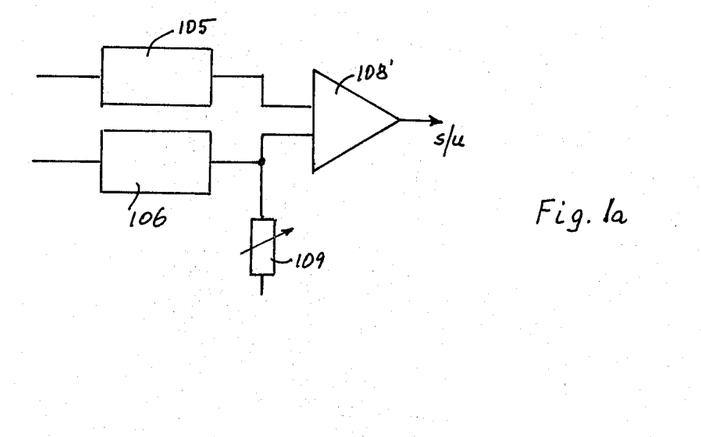
FIG. 1a is a circuit diagram of a portion of an apparatus which constitutes a modification of the apparatus shown in FIG. 1.

FIG. 1a shows a modification of the circuit of FIG. 1. The outputs of the memories 105, 106 are connected directly to a comparator circuit 108' performing the functions of the circuits 107, 108 shown in FIG. 1. One input of the circuit 108' is connected with the source 109 of reference signals denoting the selected threshold value for the quotient $Q_A$.

Figure 1B:
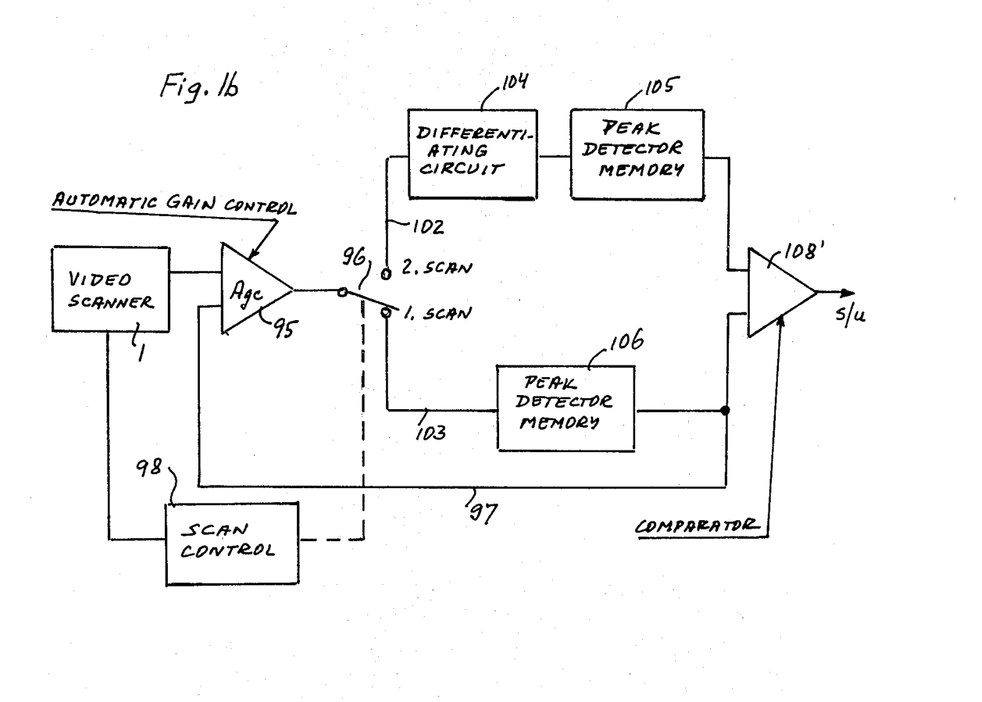
FIG. 1b is a circuit diagram of an apparatus which can ascertain the quotient $Q_K$.

FIG. 1b shows a circuit which can be utilized to ascertain the quotient $Q_K$. The output of the video scanner 1 is connected with one input of an automatic gain control circuit 95 whose output is connected with a switch 96. The switch 96 connects the output of the circuit 95 with the conductor 102 or with the conductor 103 of a circuit arrangement which is analogous to that shown in FIG. 1. The output of the peak detector memory 106 is connected with one input of the comparator circuit 108' and with the other input of the circuit 95 (note the conductor means 97). The scanner 1 has a second output which is connected with the switch 96 by a scan control 98. The arrangement is such that, after the first scan, the switch 96 disconnects the circuit 95 from the conductor 103 and connects it with the conductor 102.

In operation, an original is scanned for the first time while the circuit 95 is connected with the memory 106 via switch 96 and conductor 103. The memory 106 ascertains the maximum density value in the same manner as described hereinbefore. Such value is transmitted to the circuit 95 via conductor means 97 and is compared with the selected constant value of maximum density. If the value which is stored in the memory 106 deviates from the preselected maximum density value, the amplification factor in the circuit 95 is changed accordingly. Once the amplification factor in the circuit 95 is altered, the value of maximum density in the memory 106 is changed in accordance with the amplification and equals the preselected constant value of maximum density.

The scan control 98 thereupon changes the position of the switch 96, and the scanner 1 scans the original for a second time. The signal at the output of the scanner 1 is then amplified by the changed amplification factor of the circuit 95 and is transmitted to the differentiating circuit 104 via conductor 102. In other respects, the measurement is carried out in the same way as described in connection with FIG. 1.

Figure 2:
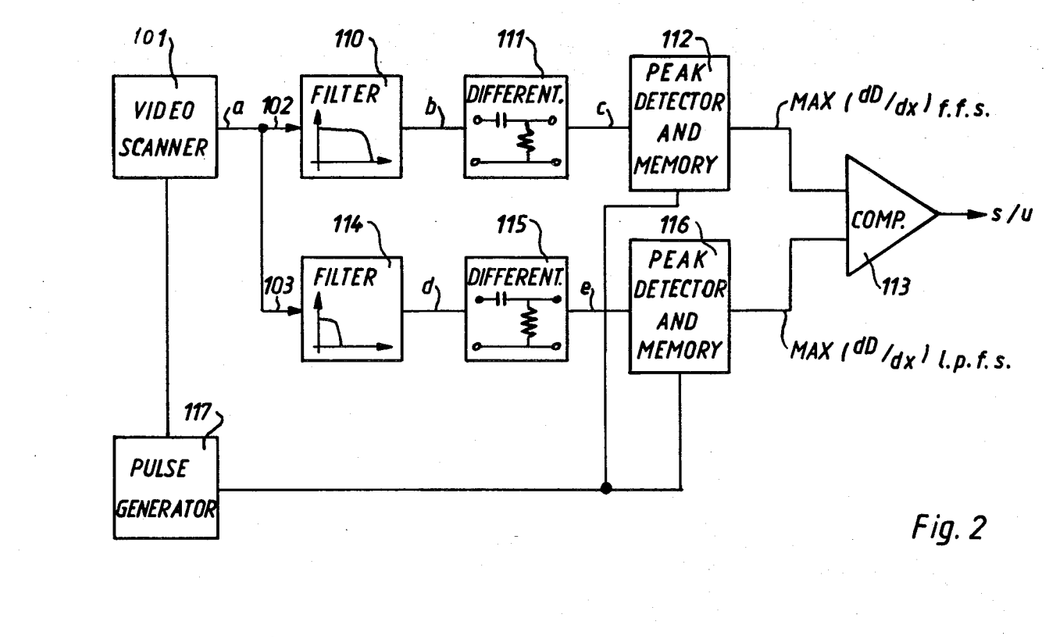
FIG. 2 is a similar diagrammatic view of an apparatus which can be resorted to in order to ascertain the quotient $Q_V$.

FIG. 2 illustrates a circuit which can be utilized for determination of the aforediscussed second sharpness quotient $Q_V$. The output of the video scanner 101 for successive film frames is again connected with two channels or paths 102, 103 the first of which contains a first processing unit including a frequency filter 110 in series with a differentiating circuit 111 and a combined peak detector and memory 112. The output of the memory 112 is connected with the corresponding input of a comparator 113. The channel 103 contains a second processing unit including a frequency filter 114 for suppression of the upper part of the frequency spectrum, a differentiating circuit 115 whose input is connected with the output of the filter 114, and an analyzing circuit here shown as a combined peak detector and memory 116 whose input is connected with the output of the circuit 115 and whose output is connected with the second input of the comparator circuit 113. A pulse generator 117 is provided to synchronize the operation of the scanner 101 with that of the memories 112 and 116.

Figure 3:
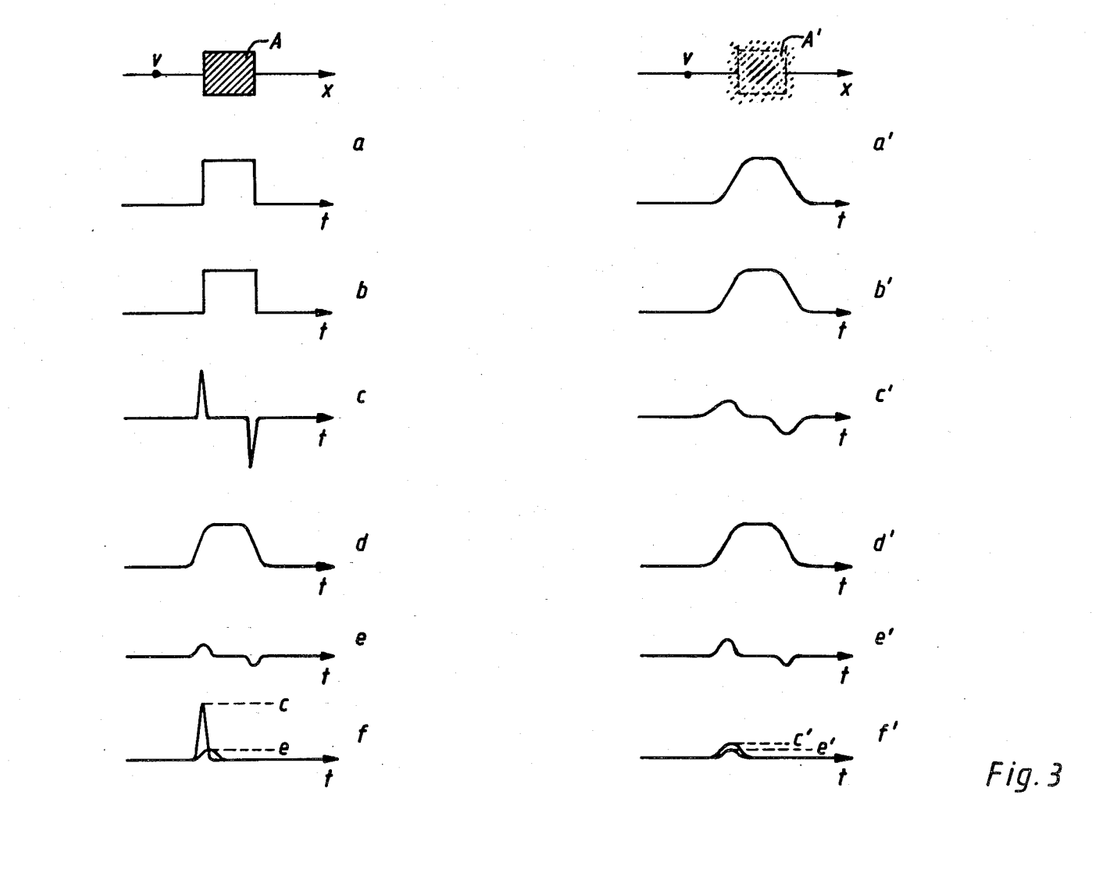
FIG. 3 represents signals which are processed in the apparatus embodying the circuit of FIG. 2.

The mode of operation of the circuit which is shown in FIG. 2 will be explained with continuous reference to FIG. 3. Variations of signals which are generated by the scanner 101 are a function of changes in sharpness of the scanned object. The left-hand portion of FIG. 3 denotes signals which are generated in response to the scanning of a sharply outlined object A, whereas the right-hand portion of FIG. 3 represents signals which are generated on scanning of an object A' whose outline is not sharp enough to warrant the making of a print. Both objects are scanned from the scanning point v in the direction indicated by the arrow x. Scanning of the sharply outlined object A entails the generation of a square pulse or signal as indicated by the curve a; on the other hand, scanning of the object A' results in the generation of a signal with sloping leading and trailing flanks (note the humped curve a' in the upper part of the right-hand portion of FIG. 3). For the sake of clarity, FIG. 2 merely shows the curve a but not the curve a'. The same holds true for the additional curves which are shown in the left-hand and right-hand portions of FIG. 3, i.e., FIG. 2 merely shows the curves (a, b, c, d, e) which are without primes.

The filter 110 is a wide-band low pass frequency filter and does not effect any appreciable modification of signals which are denoted by the curves a and a'. This can be seen in FIG. 3 which shows that signals denoted by the curves b and b' are practically identical with signals which are respectively denoted by the curves a and a'. The signal b or b' appears at the output of the filter 110, depending upon whether the input of the filter 110 receives a signal a or a'. This is due to the fact that the filter 110 serves primarily or exclusively for suppression of high-frequency noise but does not modify the useful part of the incoming signal a or a'.

The differentiating circuit 111 converts each signal b into a signal c with pronounced peaks in the regions of the vertical flanks of the square pulse. On the other hand, the signal b' is converted into a signal c' whose amplitude is a fraction of that of the signal c.

The filter 114 in the channel 103 of FIG. 2 is a narrow-band low pass frequency filter which converts the signal a (i.e., the signal represented by the curve a and denoting an object having a sharp outline) into a substantially trapezoidal signal d (see the left-hand portion of FIG. 3) which is thereupon differentiated in the circuit 115 to be converted into a signal e having a relatively low amplitude. The signal a' which is generated on scanning of an unsharp object and is transmitted to the filter 114 in the channel 103 is also converted into a substantially trapezoidal signal d' (note the right-hand portion of FIG. 3) which is thereupon differentiated in the circuit 115 to be converted into a low-amplitude signal e'. It will be noted that the signal d' resembles the signal a' or b'. The memories 112, 116 store only positive peaks of the incoming signals and, when the signals reach the corresponding inputs of the comparator circuit 113, the latter compares the signals c and e when the object (A) has a sharp outline and its output transmits a signal f which is used to initiate the making of one or more prints of the image on the respective film frame. The signal f denotes the ratio of the almost original sharpness of the slightly filtered image contents (filter 110) and the reduced sharpness of the strongly or pronouncedly filtered image contents (filter 114). When the circuit 113 compares the signals c' and e' (note the lower part of the right-hand portion of FIG. 3), the resulting signal f' is indicative of a minute difference between the peaks of the curves c' and e' and, therefore, such signal is used to prevent the copying of the respective film frame.

Figure 4:
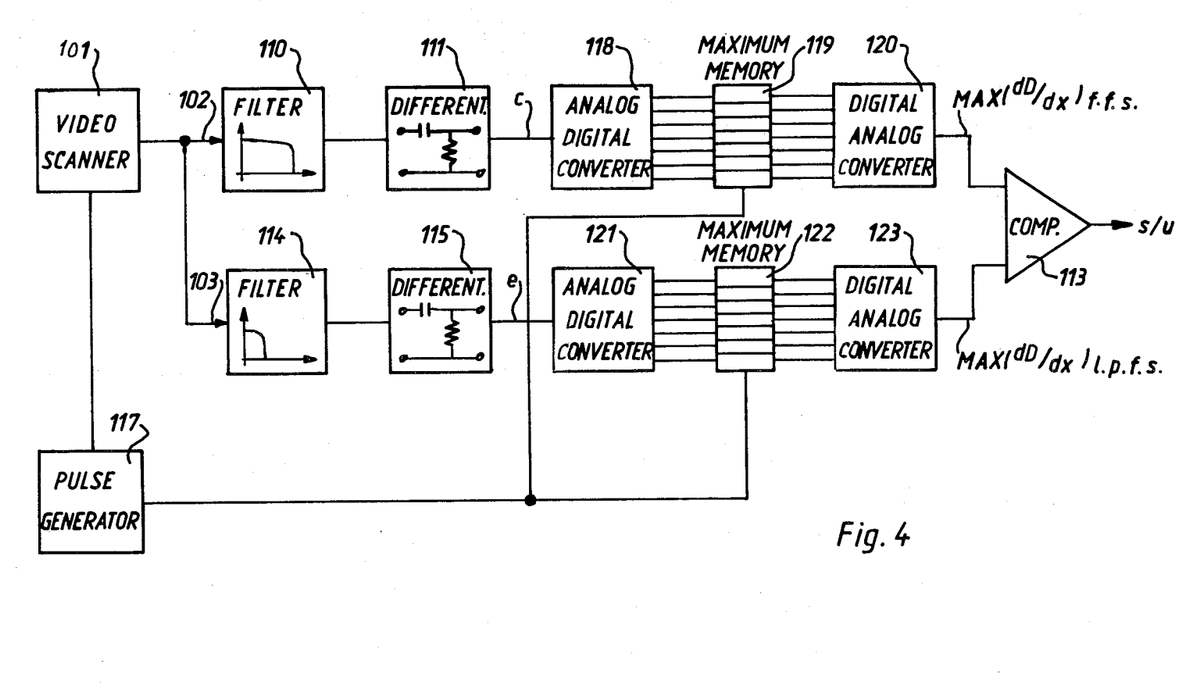
FIG. 4 is a circuit diagram of another apparatus for ascertainment of the quotient $Q_V$.

FIG. 4 illustrates a circuit arrangement which is somewhat similar to the circuit arrangement of FIG. 2. However, the analyzing circuits or memories 112, 116 of the circuit arrangement which is shown in FIG. 2 are respectively replaced with analyzing circuits including analog-to-digital converter circuits 118, 121, maximum memories 119, 122 and digital-to-analog converter circuits 120, 123. The circuit arrangement of FIG. 4 renders it possible to ascertain the maxima of unfiltered and filtered density gradients Max $(dD/dx)_{f.f.s.}$ and Max $(dD/dx)_{l.p.f.s.}$, respectively, which exceed a predetermined frequency. The analog-to-digital converter circuits 118 and 121 respectively furnish digital values for the signals c and e whereby the digital value corresponds to the amplitude of the respective signal. The maximum memories 119, 122 classify the incoming digital signals according to their intensities (magnitudes) and also count the incoming signals. The digital-to-analog converter circuit 120 thereupon generates an analog signal Max which is filtered by the minimal number of counted digital values and corresponds to the maxima of the density gradients. Such signal is transmitted to the comparator circuit 113 to be compared with the reference signal which is transmitted by the digital-to-analog converter circuit 123. A film frame is classified as unfit for copying by the comparison of the signals furnished by the outputs of the circuits 120 and 123.

By selecting the number of counts in the maximum memories 119 and 122, one can achieve that these circuits consider only density gradient signals of predetermined value and frequency, i.e., that they exclude certain density gradient signals in connection with ascertainment of the frequency. For example, such procedure can be resorted to in order to prevent specks of dust, scratches and like defects on the film frames from influencing the examination of images for satisfactory or insufficient sharpness. Thus, the memories 119, 122 can be designed to disregard signals denoting maximal or close-to-maximal density differences. To this end, the counter or counters which are intended to record the maximum density differences can be adjusted to record only those differences which cannot be achieved in the examination of film frames (it is assumed here that only the overflowing counters are utilized for generation of the maximum signal).

Figure 5:
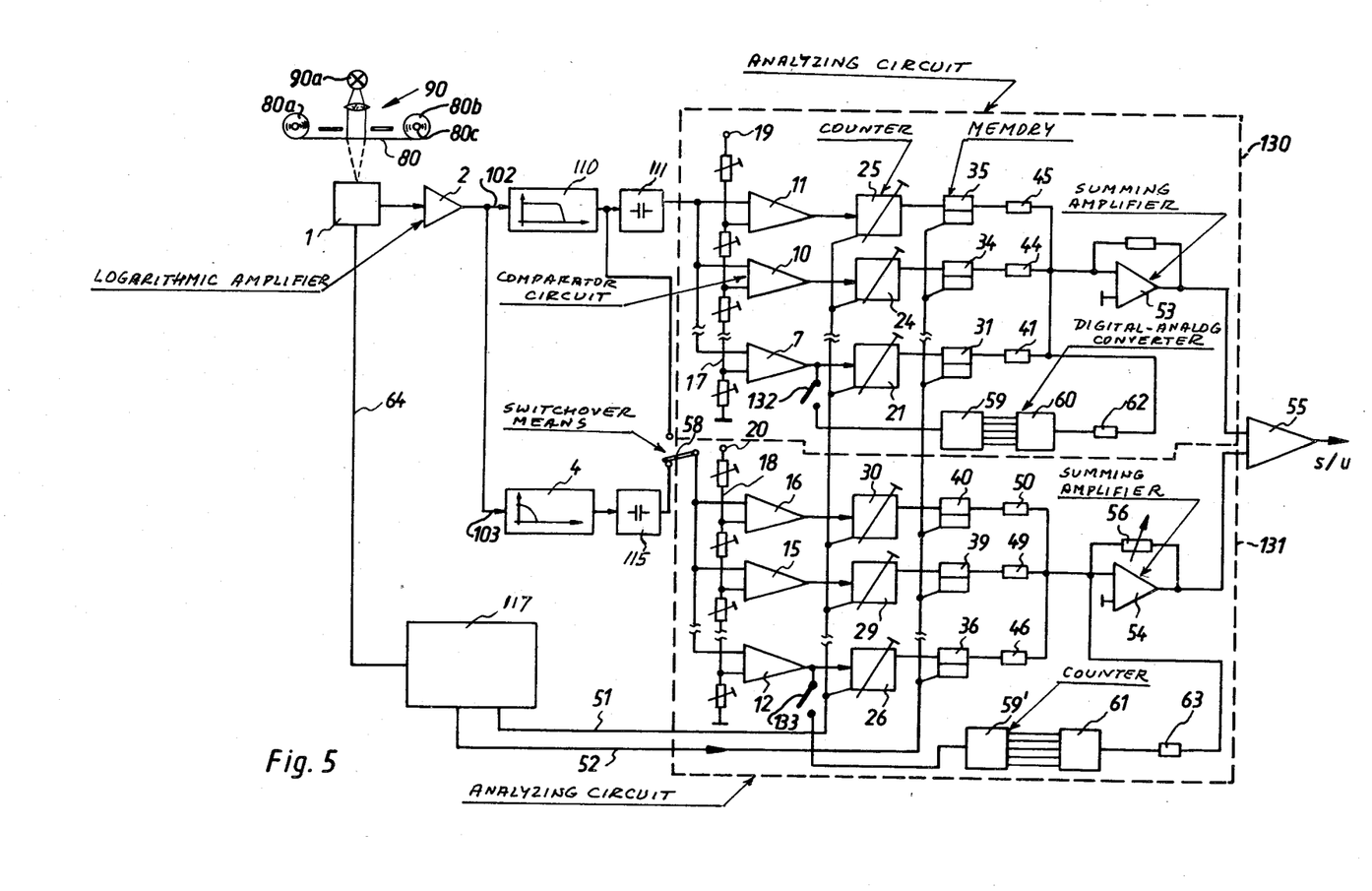
FIG. 5 is a more detailed view of an apparatus which can be utilized to ascertain the quotient $Q_A$, $Q_V$ or $Q_H$, i.e., an apparatus for photoelectric examination of successive originals of varying sharpness preparatory to the making of reproductions of those originals which are fit for copying.

A more detailed description of an apparatus which can analyze the differentiated signals transmitted in the channels 102 and 103 in order to ascertain the frequency and amplitude of the corresponding signals is shown in FIG. 5. All such parts of the apparatus of FIG. 5 which are identical with or clearly analogous to the previously described parts of the circuit shown in FIG. 2 are denoted by similar reference characters.

Referring now to FIG. 5, a web 80 of spliced-together exposed and developed photographic films is transported along a predetermined path (defined by a suitable film platform, not shown) from a supply reel 80a to a takeup reel 80b. The means for moving the web 80 along its path in stepwise fashion includes the spindle 80c for the takeup reel 80b. The means for scanning successive originals, i.e., successive film frames of the web 80, includes a light source 90a and an optical system 90 at one side of the path for the web 80 and the vidicon tube or video scanner 1 at the other side of the path. The tube 1 spot scans, line-by-line, a selected portion of or the entire film frame which is in register with the optical system 90 (i.e., that film frame which occupies a predetermined position with respect to the scanning means), and its output transmits video signals to the input of a logarithmic amplifier 2 whose output transmits signals to the inputs of a first frequency filter 110 and a second frequency filter 4 which latter is connected in parallel with the filter 110. The filter 110 transmits the entire frequency spectrum and its output is connected with a first differentiating circuit 111. The filter 4 suppresses the upper portions of the frequency spectra and its output is or can be connected to the input of a second differentiating circuit 115. The outputs of the circuits 111 and 115 are connected to two discriminator chains which respectively include comparator circuits 7 to 11 and 12 to 16. The comparator circuits 8, 9, 13 and 14 are not specifically shown in the drawing. The outputs of the differentiating circuits 111, 115 are respectively connected to the first inputs of the comparator circuits 7-11 and 12-16, and the second inputs of comparator circuits 7-11 and 12-16 are respectively connected with first and second voltage divider chains 17 and 18 serving to supply reference voltages. The upper terminals of the voltage divider chains 17, 18 are respectively shown at 19 and 20.

The outputs of comparator circuits 7-11 and 12-16 are respectively connected to forward counters 21-25 and 26-30 (the counters 22, 23, 27 and 28 are not shown). The outputs of the counters 21-25 and 26-30 are respectively connected with the inputs of memories 31 to 35 and 36 to 40 (the memories 32, 33, 37 and 38 are not shown). The outputs of memories 31-35 are connected with one input of a first summing amplifier 53 by way of resistors 41 to 45, and the outputs of memories 36-40 are connected with one input of a second summing amplifier 54 by way of resistors 46 to 50 (the resistors 42, 43, 46 and 47 are not shown). The outputs of the summing amplifiers 53 and 54 (which constitute digital-to-analog converters) are connected with the corresponding inputs of a comparator circuit 55 with a digital output.

A pulse generator 117 is connected with the vidicon tube 1 by means of a synchronizing conductor 64. Erasing signal transmitting conductors 51 and 52 connect the corresponding outputs of the pulse generator 117 with the respective inputs of the counters 21 to 30 and memories 31 to 40. A potentiometer 56 is connected in parallel with the second summing amplifier 54; this potentiometer is adjustable to furnish a reference signal denoting the threshold value for comparison with the analog voltages corresponding to the maximum density gradients and generated at the outputs of differentiating circuits 111, 115 of the two filter channels or paths 102, 103.

The heretofore described parts of the apparatus shown in FIG. 5 operate as follows:

The vidicon tube 1 scans a portion of or the entire film frame (original) which is in register with the optical system 90. Such scanning takes place line-by-line, and the resulting video signals are transmitted to the frequency filters 110 and 4 via logarithmic amplifier 2 and channels 102, 103. As mentioned above, the filter 110 is a low pass filter which transmits the entire frequency spectrum whereas the low-pass filter 4 suppresses the upper portions of the spectrum, i.e., those portions which are important for evaluation of image sharpness. The thus filtered video signals are differentiated in the circuits 111 and 115 which transmit signals corresponding to the density gradients of the scanned image. Such signals are respectively transmitted to the discriminator chains 7-11 and 12-16. The voltage dividers 17 and 18 include adjustable resistors and furnish reference voltages enabling the comparator circuits 7-11 and 12-16 to discriminate among signals which are furnished by the differentiating circuits 111 and 115 in such a way that the corresponding forward counters 21-25 and 26-30 receive impulses whenever the intensity of differentiated signals exceeds the intensity or level of reference voltages supplied to the comparator circuits 7-11 and 12-16. The counters store the impulses and are adjusted in such a way that the corresponding memories 31-35 and 36-40 receive signals only when the number of impulses furnished by comparator circuits 7-11 and 12-16 per scanned line of the film frame at the evaluating station exceeds a predetermined number. The counters 21-30 are reset to zero (by the signal which is transmitted via conductor means 51) whenever the tube 1 completes the scanning of a complete line. It will be noted that the memories 31-40 receive and store signals only when the number of impulses received by the corresponding counters 21-30 exceeds the preselected number while the tube 1 scans a line of the image on the film frame at the observation station. It can be said that the components 7 to 40 constitute or form part of two discrete systems or circuits 130 and 131 which analyze the amplitude and frequency of impulses. The memories 31-35 and 36-40 respectively store the two maximum density gradients upon completion of scanning of all lines of the film frame (or of the selected portion of the film frame) at the observation station. The signals which are stored in the memories 31-35 and 36-40 are in the form of binary bits. The bits which are stored in the memories 31-35 and 36-40 are converted into analog voltages; such conversion takes place in the summing amplifiers 53 and 54 which receive the stored information via resistors 41-45 and 46-50. The two analog voltages corresponding to the maximum density gradients are compared in the comparator circuit 55. The binary output voltage of the comparator circuit 55 denotes, upon completion of scanning of the entire image or the entire selected portion of image, whether or not the contents of the scanned image are sufficiently sharp for the making of reproductions.

When the evaluation of a signal at the output of the comparator circuit 55 is completed, the information which is stored in the memories 31-35 and 36-40 is erased in response to transmission of a signal via conductor means 52. This enables the apparatus to begin with the scanning of the next film frame on the web 80. The pulse generator 117 insures proper synchronization. It will be noted that the pulse generator 117 times the transmission of erasing signals to counters 21-30 to take place after completion of scanning of each line, and the transmission of erasing signals to memories 31-40 to take place upon completion of scanning of an entire image or selected portion of an image.

The signal at the output of the comparator circuit 55 can be evaluated upon completion of the scanning of an entire image. However, it is equally within the purview of the invention to evaluate such signal (and to transmit erasing signals to the memories 31-40 via conductor means 52) at more frequent intervals, always in response to a signal from the pulse generator 117. In other words, one can evaluate the sharpness of the entire image (or the entire selected portion of the image) or the sharpness of a desired number of spots of the entire image (or selected portion of the image). It is further possible to carry out an evaluation upon completed scanning of each line of the film frame at the observation station. The results of such evaluation can be utilized (e.g., by resorting to a computer) for even more reliable classification of film frames into two groups which are respectively acceptable and unfit for the making of reproductions.

The heretofore described parts of the apparatus shown in FIG. 5 correspond essentially to those of the circuit which is shown in FIG. 2 and serve for determination of the quotient $Q_V$ as a criterion of the sharpness of images. The main difference is that the peak detectors and memories 112, 116 of FIG. 2 are replaced with the two analyzing circuits 130, 131 of FIG. 5. The circuits 130, 131 embrace the parts which are shown within the respective broken-line boxes of FIG. 5, and each thereof serves to analyze the amplitude and frequency of the respective impulses. Thus, each analyzing circuit has a discriminator chain which receives signals from the corresponding differentiating circuit and determines the amplitude of incoming signals. The thresholds of the comparator circuits 7-11 are selected in such a way that the strongest impulse, i.e., the impulse denoting the maximum density gradient, exceeds all thresholds so that each of the counters 21-25 receives a signal. A weaker impulse does not exceed the threshold of the comparator circuit 11 but may exceed those of the circuits 7-10. A very weak impulse may exceed only the threshold of the comparator circuit 7. An even weaker impulse does not exceed any of the thresholds and, therefore, such impulse is not recorded by any of the counters 21-25. In other words, the analyzing circuit 130 stores a signal denoting the maximum density gradient when the comparator circuit 11 has transmitted a signal to each of the counters 21-25 because the intensity of a signal has exceeded the threshold of the circuit 11. The circuit 131 evaluates the impulses of lower amplitude in an analogous manner.

As mentioned above, the heretofore described parts of the apparatus shown in FIG. 5 determine the quotient $Q_V$ as a criterion which is indicative of the sharpness of the scanned image. The apparatus of FIG. 5 further comprises a switchover device here shown as an electric switch 58 which can be actuated to disconnect the second filter 14 and the second differentiating circuit 115 from the discriminator chain 12-16 and to connect the latter with the output of the filter 110. The non-differentiated video signal at the output of the filter 110 is then transmitted directly to the comparators 12-16; this enables the summing amplifier 54 to transmit an analog voltage signal which is proportional to the maximum density range of the scanned image. In such instances, the output of the comparator circuit 55 transmits a signal which denotes the quotient $Q_K$, and this quotient is resorted to for classification of the examined film frames.

If the sharpness quotient $Q_H$ is to be utilized as an auxiliary criterion for evaluation of the sharpness of images of film frames forming part of the web 80, the output of a comparator circuit (e.g., 7 and 12) in each of the discriminator chains 7-11 and 12-16 is connected to the input of a larger counter (shown at 59 and 59') by closing the switches 132 and 133. The overflow signals at the outputs of the counters 59 and 59' are respectively transmitted to digital-to-analog converter circuits 60 and 61 (note the converter circuits 120 and 123 of FIG. 4) and thence to the summing amplifiers 53, 54 (via resistors 62, 63). Thus, such signals are also utilized for determination of sharpness (quotient $Q_H$) of the scanned images. When the switch 58 is thereupon returned to the position shown in FIG. 5, the apparatus of FIG. 5 operates in the same way as that of FIG. 4.

The improved apparatus can be modified in a number of additional ways without departing from the spirit of the invention. For example, the images at the observation station can be scanned by resorting to a digital scanning device, to a Nipkow disc, to a CCD arrangement and/or others. If a digital scanner is used, the area of the scanned spots is preferably between 0.07 times 0.07 and 0.1 times 0.1 mm².

Furthermore, it will be readily understood that the scanning can take place along straight or otherwise configurated lines. For example, one can resort to devices which scan entire images or selected portions of images along helical, undulate, Lissajous type or otherwise configurated lines.

It is also possible to omit the logarithmic amplifier 2 if the apparatus embodies voltage divider chains 17 and 18 which insure that each of the two discriminator chains including the comparator circuits 7-11 and 12-16 is capable of ascertaining the density of scanned spots.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. A method of examining a series of successive originals of varying sharpness, especially exposed and developed film frames, to allow for detection of those originals which are unfit for the making of reproductions, comprising the steps of moving successive originals to a predetermined position; photoelectrically scanning at least a selected portion of the original in said position and generating signals which are indicative of the characteristics of such selected portion; utilizing said signals to ascertain the density range of the selected portion of the original in said position; processing said signals to determine the density gradient of at least one scanned region of the selected portion; forming a quotient of the determined density gradient and the density range of the respective selected portion; comparing the quotient with a predetermined threshold value; and classifying the respective original as being suitable for reproduction when the quotient exceeds said threshold value.

2. The method of claim 1, wherein said scanning step includes line-by-line scanning of said selected portion of the original in said predetermined position.

3. The method of claim 1, wherein said scanning step includes photoelectrically scanning only said selected portion of the original in said predetermined position.

4. The method of claim 1, further comprising the step of excluding from said quotient forming step all gradients whose density exceeds a predetermined value.

5. The method of claim 4, wherein said excluding step comprises increasing the dimensions of scanned spots of the selected portion of the original in said predetermined position.

6. The method of claim 1, further comprising the steps of scanning the original in said predetermined position for a second time and regulating the density range in the course of the second scanning step so that the density range is held at a constant value.

7. A method of examining a series of successive originals of varying sharpness, especially exposed and developed film frames, to allow for detection of those originals which are unfit for the making of reproductions, comprising the steps of moving successive originals to a predetermined position; photoelectrically scanning at least a selected portion of the original in said position and generating signals which are indicative of the characteristics of such selected portion; processing said signals to ascertain first maximum density gradients derived from the entire spectrum of said selected portion; processing said signals to ascertain second maximum density gradients derived from the lower-frequency portion of the spectrum of said selected portion; forming a quotient of the first and the corresponding second density gradients; and classifying the corresponding original as being suitable for reproduction when the quotient exceeds a predetermined threshold value.

8. The method of claim 7, wherein said second processing step includes filtering said signals so as to eliminate from use in ascertainment of the second density gradients those signals which are indicative of the higher-frequency portion of the spectrum of said selected portion of the original in said position.

9. The method of claim 7, wherein said scanning step includes photoelectrically scanning only said selected portion of the original in said predetermined position.

10. The method of claim 7, further comprising the step of excluding from said quotient forming step all gradients whose density exceeds a predetermined value.

11. The method of claim 10, wherein said excluding step comprises increasing the dimensions of scanned spots of the selected portion of the original in said predetermined position.

12. The method of claim 7, further comprising the steps of utilizing said signals to ascertain the density range of the selected portion of the original in said position, processing said signals to determine the density gradient of at least one scanned region of the selected portion, forming a quotient of said last named density gradient and said density range, and multiplying said first named quotient by said last named quotient.

13. A method of examining a series of successive originals of varying sharpness, especially exposed and developed film frames, to allow for detection of those originals which are unfit for the making of reproductions, comprising the steps of moving successive originals to a predetermined position; photoelectrically scanning at least a selected portion of the original in said position and generating signals which are indicative of the characteristics of such selected portion; processing said signals to ascertain the frequency and magnitude of first maximum density gradients derived from the entire spectrum of said selected portion; processing said signals to ascertain the magnitude and frequency of second maximum density gradients derived from the lower-frequency portion of the spectrum of said selected portion; determining the total number of those first density gradients whose magnitude exceeds a first predetermined threshold value; determining the total number of those second density gradients whose magnitude exceeds a second predetermined threshold value; forming a quotient of the total numbers of said first and second density gradients; and classifying the respective original as being suitable for reproduction when the quotient exceeds a predetermined threshold value.

14. The method of claim 13, wherein said second processing step comprises filtering said signals so as to eliminate from use in ascertainment of the second density gradients those signals which are indicative of the higher-frequency portion of the spectrum of said selected portion of the original in said position.

15. The method of claim 13, wherein said scanning step includes photoelectrically scanning only said selected portion of the original in said predetermined position.

16. The method of claim 13, further comprising the step of excluding from said quotient forming step all gradients whose density exceeds a further predetermined threshold value.

17. The method of claim 16, wherein said excluding step comprises increasing the dimensions of scanned spots of the selected portion of the original in said predetermined position.

18. The method of claim 13, further comprising the steps of utilizing said signals to ascertain the density range of the selected portion of the original in said position, processing said signals to determine the density gradient of at least one scanned region of the selected portion, forming a quotient of said last named density gradient and said density range, and multiplying said first named quotient by said last named quotient.

19. The method of claim 13, further comprising the steps of forming a second quotient of the first and the corresponding second maximum density gradients, and multiplying said first mentioned quotient by said second quotient.

20. The method of claim 19, further comprising the steps of utilizing said signals to ascertain the density range of the selected portion of the original in said position, processing said signals to determine the density gradient of at least one scanned region of the selected portion, forming a third quotient of said last named density gradient and said density range, and multiplying the product of said first named and second quotients by said third quotient.

21. Apparatus for examining a series of successive originals of varying sharpness, such as exposed and developed film frames, to allow for detection of those originals which are unfit for the making of reproductions, comprising means for moving successive originals of a series of originals to a predetermined position; means for photoelectrically scanning at least a selected portion of the original in said position, including means for generating signals which are indicative of the characteristics of such selected portion of the original in said position; means for utilizing said signals to ascertain the density range of the selected portion of the original in said position; means for processing said signals to determine the density gradient of at least one scanned region of the selected portion of the original in said position; means for forming a quotient of the determined density gradient and the density range of the respective selected portion; a source of reference signals denoting a predetermined threshold value; and means for comparing said quotient with said threshold value, an original being considered fit for the making of reproductions when said quotient exceeds said threshold value.

22. The apparatus of claim 21, wherein said ascertaining means comprises a first peak detector and memory and said processing means comprises a differentiating circuit and a second peak detector and memory in series with said differentiating circuit, said quotient forming means including a further circuit having first and second inputs, said first and second memories respectively having first and second outputs connected to the corresponding inputs of said further circuit.

23. The apparatus of claim 21, wherein said ascertaining means comprises a first peak detector and memory and said processing means comprises a differentiating circuit and a second peak detector and memory in series with said differentiating circuit, said quotient forming and comparing means together constituting a comparator circuit having a first input connected to said source of reference signals and a second input, said memories having outputs connected directly with the second input of said comparator circuit.

24. Apparatus for examining a series of successive originals of varying sharpness, especially exposed and developed film frames, to allow for detection of those originals which are unfit for the making of reproductions, comprising means for moving successive originals of a series of originals to a predetermined position; means for photoelectrically scanning at least a selected portion of the original in said position, including means for generating signals which are indicative of the characteristics of such selected portion of the original in said position; first processing means for processing said signals to ascertain first maximum density gradients derived from the entire spectrum of the selected portion of the original in said position; second processing means for processing said signals to ascertain second maximum density gradients derived from the lower-frequency portion of the spectrum of the selected portion of the original in said position; and means for determining the fitness of the original in said position for reproduction, including means for comparing signals denoting said first and second maximum density gradients.

25. The apparatus of claim 24, wherein each of said processing means comprises a frequency filter, a differentiating circuit in series with the respective filter, and a signal analyzing circuit in series with the respective differentiating circuit, said analyzing circuits having outputs connected with said comparing means.

26. The apparatus of claim 25, wherein each of said filters is a low-pass frequency filter, one of said filters constituting a wide band filter and the other of said filters constituting a narrow band filter.

27. The apparatus of claim 25, wherein each of said analyzing circuits comprises a peak detector and memory.

28. The apparatus of claim 25, wherein each of said analyzing circuits comprises an analog-to-digital converter circuit, a maximum memory in series with the respective analog-to-digital converter circuit, and a digital-to-analog converter circuit in series with the respective maximum memory.

29. The apparatus of claim 25, wherein each of said analyzing circuits includes a signal amplitude and frequency analyzer.

30. The apparatus of claim 29, wherein each of said analyzers comprises a discriminator chain including a plurality of comparator circuits having outputs, means including voltage divider means for supplying reference voltages to said comparator circuits, forward counters connected with the outputs of said comparator circuits, memories connected in series with said counters, and a summing amplifier connected in series with the respective counters, said signal comparing means having first and second inputs and said amplifiers having outputs each connected with a different input of said signal comparing means.

31. The apparatus of claim 30, further comprising pulse generator means connected with said scanning means and arranged to reset said counters and to erase the contents of said memories at predetermined stages of scanning of the originals.

32. The apparatus of claim 30, wherein each of said analyzers further comprises an additional counter, a digital-to-analog converter circuit connected in series with the respective additional counter, a resistor connecting the converter circuit with the respective summing amplifier, and means for connecting the output of one comparator circuit in each of said discriminator chains with the respective additional counter.

33. The apparatus of claim 32, wherein said connecting means comprise switches.

34. The apparatus of claim 32, wherein said additional counters are larger than the first mentioned counters of the respective analyzers.

35. The apparatus of claim 25, wherein each of said filters and each of said differentiating circuits has an output and each of said analyzing circuits has a summing amplifier, and further comprising switchover means operable to connect the analyzing circuit of said second processing means with the output of the differentiating circuit of said second processing means or with the output of the frequency filter of said first processing means so that the summing amplifier of said second processing means respectively receives differentiated signals which have passed through the frequency filter of said second processing means or a signal corresponding to the maximum density range of the scanned portion of the respective original.

36. The apparatus of claim 35, wherein said signal corresponding to the maximum density range of the scanned portion of the respective original is an analog voltage signal.

37. Apparatus for examining a series of successive originals of varying sharpness, especially exposed and developed film frames, to allow for detection of those originals which are unfit for the making of reproductions, comprising means for moving successive originals of a series of originals to a predetermined position; means for photoelectrically scanning at least a selected portion of the original in said position, including means for generating signals which are indicative of the characteristics of such selected portion of the original in said position; processing means for processing said signals to ascertain first density gradients derived from the selected portion of the original in said position and to ascertain second density gradients derived from the selected portion of the original in said position; and means for determining the fitness of the original in said position for reproduction, including means for comparing signals denoting said first and second density gradients.

* * * * *